United States Patent [19]

Takagi et al.

[11] Patent Number: 4,956,742
[45] Date of Patent: Sep. 11, 1990

[54] SWITCH GEAR

[75] Inventors: Kunihiko Takagi, Tama; Masazumi Shiraishi, Hachioji; Ken-ichi Sato, Yokohama, all of Japan

[73] Assignee: Kabushiki Kaisha Toshiba, Kawasaki, Japan

[21] Appl. No.: 388,857

[22] Filed: Aug. 3, 1989

[30] Foreign Application Priority Data

Aug. 11, 1988 [JP] Japan ................................. 63-198955
Sep. 26, 1988 [JP] Japan ................................. 63-238817
Jan. 23, 1989 [JP] Japan ................................. 1-011894

[51] Int. Cl.⁵ .............................................. H02B 1/04
[52] U.S. Cl. ................................... 361/131; 361/341; 361/385; 200/150 JA
[58] Field of Search ............... 361/115, 117, 118, 131, 361/132, 385, 341, 353, 361; 200/150 A, 150 JA

[56] References Cited

U.S. PATENT DOCUMENTS 3,233,069 2/1966 Date ................................. 200/150 JA
4,570,202 2/1986 Nishida et al. ................... 361/131 X

FOREIGN PATENT DOCUMENTS 811215 2/1980 Japan .
1141962 2/1969 United Kingdom .

OTHER PUBLICATIONS

Patent Abstracts of Japan, vol. 5, No. 97, (E-86)(869), 12/15/81; and JP-A-56 118313, 9/17/81.

*Primary Examiner*—Derek S. Jennings
*Attorney, Agent, or Firm*—Foley & Lardner, Schwartz, Jeffery, Schwaab, Mack, Blumenthal & Evans

[57] ABSTRACT

In a switch gear, such as a high-voltage enclosed switchboard and a vacuum load-break switch, of the type wherein items of electrical equipment including disconnecting devices and circuit-breaking devices are installed within a case, masses of a silicone gel are filled in compartments accommodating the electrical equipment instead of the sulfur hexafluoride used heretofore. An air space is left above the silicone gel in each compartment. This construction enables the provision of a safer switch gear of smaller size than heretofore.

8 Claims, 5 Drawing Sheets

SWITCH GEAR

BACKGROUND OF THE INVENTION

This invention relates generally to electrical switch gear and more particularly to switch gear such as high-voltage enclosed switchboards and vacuum load-break switches having high dielectric strength, high degree of safety, and moreover the possibility of being miniaturized.

A typical example of a known switch gear has an outer housing in the form of a sealed box structure of steel plate, the interior of which is divided into a plurality of chambers or compartments by a plurality of partition walls. Within these compartments, various items of electrical equipment such as a disconnector, a circuit breaker, a current transformer, and a lightning arrester are installed. In general, a box structure thus accommodating such electrical equipment contains air in its unoccupied spaces. Recently, however, sulfur hexafluoride gas has been sealed in as an insulation gas in a part of the box structure to improve the insulating characteristic between the various items of electrical equipment and also between metal members for grounding and thereby to achieve miniaturization of the entire switch gear.

In a switch gear of such known structural organization, problems as enumerated below have been encountered.

1. First, the outer box structure is required to be gas tight in order to prevent leakage of the sulfur hexafluoride ($SF_6$) gas sealed in therewithin. For this reason not only does its fabrication (welding and assembly) require much labor, but a monitoring device for monitoring the interior pressure after sealing in of the gas is necessary.

2. If, in order to seal in $SF_6$ gas within the box structure, the air in the interior thereof is to be first evacuated, it will be necessary to reinforce the box structure that it can withstand the difference between the interior and exterior pressures. This will entail an increase in fabrication cost. On the other hand, if the air is replaced by the $SF_6$ gas by a forced circulation method, structural reinforcement will not be necessary, but labor and time will be required for carrying out the replacement.

3. Since the box structure must be a sealed vessel, the internal pressure will rise in the event of an interior short circuit due to some cause. This will give rise to the possibility of an explosion which would be extremely dangerous to the maintenance personnel.

4. For inspection of the equipment within the box structure (for example, inspection of the degree of wear of the contact points of the circuit breaker), discharging and recharging of the insulation gas before and after unsealing is necessary, whereby much time is required for maintenance and inspection.

SUMMARY OF THE INVENTION

Accordingly, it is an object of this invention to provide a switch gear which, in comparison with known switch gear of like character, is safer, can be maintained and inspected by simpler procedures requiring less labor and time, and moreover can be miniaturized.

According to this invention, briefly summarized, there is provided a switch gear comprising: a box structure; items of electrical equipment including disconnecting means and circuit breaking means provided within the box structure; connecting conductors for connecting these electrical equipment items; operating mechanisms for operating the disconnecting means and the circuit breaking means; partition walls for partitioning the interior of the box structure into compartments for accommodating these operating mechanisms and compartments for accommodating the electrical equipment items; and masses of a silicone gel filling the compartments accommodating the electrical equipment items.

DETAILED DESCRIPTION OF THE PREFERRED EMBODIMENTS

Some embodiments of the switch gear according to this invention will now be described with reference to the drawings.

Figure 1:
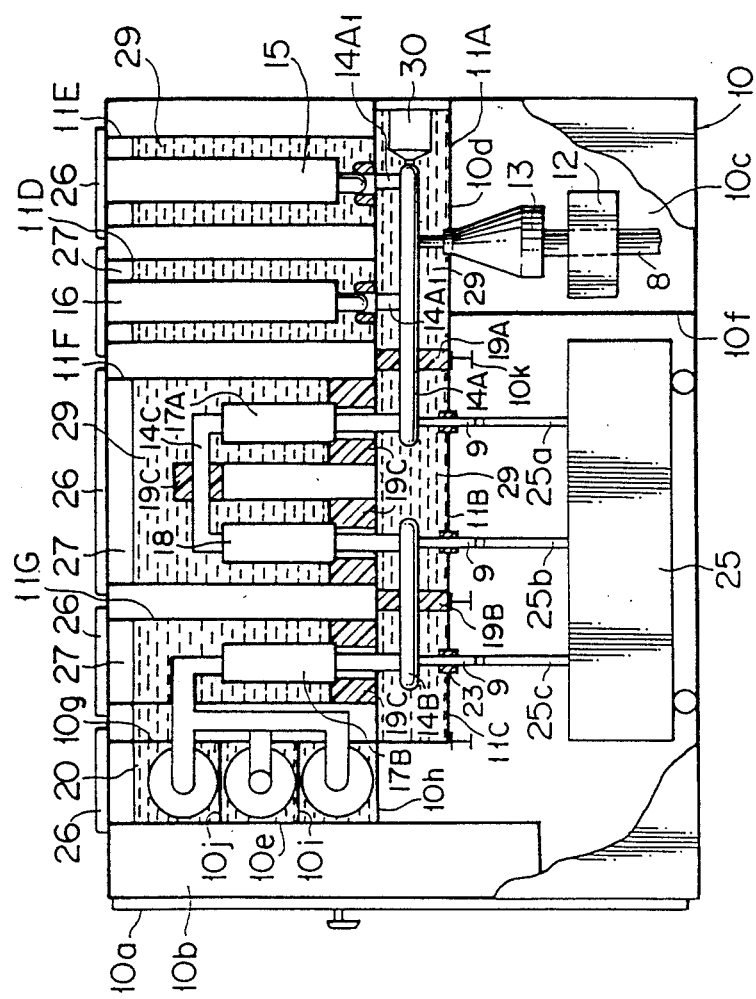
FIG. 1 is a side elevation, mostly in vertical section and with parts cut away, showing the essential construction of a high-voltage enclosed switchboard as one example of the switch gear of this invention.

In the embodiment shown in FIG. 1, which is a high-voltage enclosed switchboard, only the parts for single phase are shown for sections other than a horizontal bus compartment 20 at the front upper part.

The functional parts of the enclosed switchboard are enclosed within a housing comprising a box structure 10 substantially of the shape of a rectangular parallelepiped. This box structure 10 at its front side (left side as viewed in FIG. 1) has a door 10a, between which and an inner partition wall 10e a control chamber 10b for a low-voltage circuit is provided. To the rear of this control chamber 10b is provided a horizontal partition wall 10d dividing the interior of the box structure 10 into upper and lower compartments. A vertical partition wall 10f is provided below this partition wall 10d and toward the rear of the box structure 10. An operating mechanism 25 is accommodated within the compartment forward of the partition wall 10f. A cable 8 rises upward from a pit (not shown) formed in the floor at the rear part of the box structure 10 behind the partition wall 10f. A current transformer 12 is mounted on this cable 8, which is connected to a cable head 13 secured to the lower surface of the horizontal partition wall 10d.

On the upper surface of the partition wall 10d toward the rear part thereof, an insulation cylinder 11A is disposed horizontally, its rear end being secured to the rear wall of the box structure 10 made of a synthetic resin and its front end being secured to an insulation support member 19A of disk shape This insulation cylinder 11A is supported by an H-shape steel beam 10k extending transversely along the lower surface of the horizontal partition wall 10d. To the front face of the insulation cylinder 11A is secured the rear end of an insulation cylinder 11B. The front end of this insulation cylinder 11B is secured to the rear face of an insulation support member 19B. The insulation cylinder 11B is supported substantially coaxially relative to the insulation cylinder 11A. A somewhat short insulation cylinder 11C is secured at its rear end to the front face of the insulation support member 19B and is supported at its front end by a vertical partition formed at the front end of the horizontal partition wall 10d.

Insulation cylinders OLD and ALE are mounted vertically over a sealing material (not shown) on the upper surface of the insulation cylinder llA. An insulation cylinder 11F of a vertical section of inverted U shape is mounted vertically over annular insulation members 10c on the upper surface of the insulation cylinder 11B. Similarly an insulation cylinder 11G is vertically mounted over an annular insulation member 19c on the insulation cylinder 11C at the lower left end. On the front face side of this insulation cylinder 11G, a partition wall 10g connected at its lower end to a rising part of the left end of the partition wall 10d is vertically provided. In the lower part of the horizontal bus compartment 20 between this partition wall 10g and the partition wall 10e, a horizontal partition wall 10h is provided. The compartment above this wall 10h is divided by partition walls 10j and 10i into three chambers. The upper surfaces of the horizontal bus compartment and the insulation cylinders 11D to 11G to the rear thereof are provided with small holes (not shown).

Between the insulation cylinders 11A and 11B, a connecting conductor 14A which extends through the insulation support member 19A is provided substantially coaxially. To the rear end of this connecting conductor 14A is connected by screw threads the front end of a voltage detection element 30 supported at its rear face by an insulation plate (not shown) mounted on the rear wall of the box structure 10. The inner terminal of the aforementioned cable head 13 is in contact with the lower side of the connecting conductor 14A at a point somewhat forward of the voltage detection element 30. Short connecting conductors 14A$_1$ are connected to the upper surface of the conductor 14A at its middle part and a part near its rear end.

Within the rear insulation cylinder 11E is provided an annular contact point to the lower end of which the upper end of the connecting conductor 14A$_1$ is connected by fitting therein. A lightning arrester 15 is provided in the interior of the insulation cylinder 11E. The terminal part of the lower end of this lightning arrester 15 is in screw thread connection with the upper part of the above mentioned annular contact point. Within the insulation cylinder 11D at its lower end is also provided an annular contact point to which a connecting conductor 14A$_1$ is fitted for connection. A transformer for instruments is provided into the interior of this insulation cylinder 11D, and the terminal part at its lower end is in screw thread connection with the annular contact point.

Furthermore, within the cylindrical part on the right side, as viewed in FIG. 1, of the intermediate insulating cylinder 11F of inverted U shape, a disconnector 17A opened and closed in a vacuum bulb is accommodated. Within the cylindrical part on the left side, a circuit breaker 18 also in a vacuum bulb is accommodated. A connecting conductor 14C is supported by an insulation support member 19C, which is mounted in the middle part of the insulation cylinder 11F. The connecting conductor 14C is connected between terminals on the fixed side at the upper ends of the disconnector 17A and the circuit breaker 18, the lower ends of which are supported by annular insulation support members 19C and connected to cylindrical conductors on the lower side by a flexible conductor (not shown) The lower ends of the cylindrical conductors are respectively connected by screw threads to the front end of the connecting conductor 14A and the rear end of a connecting conductor 14B extending between and partly through the insulation cylinders 11B and 11C.

At the upper part of the aforementioned operating mechanism 25, actuating rods 25a, 25b, and 25c which undergo up-and-down movement under electrical motivation extend out upwardly. The upward ends of these actuating rods 25a, 25b, and 25c are in the form of respective insulation rods 9. These insulation rods 9 extend through respective sealing bushings 23 into the insulation cylinders 11B and 11C. The rear insulation rod 9 extends through a through hole (not shown) at the front end of the connecting conductor 14A and through the interior of a cylindrical conductor below the disconnector 17A. The upper end of this insulation rod 9 is connected to a movable terminal (not shown) of the disconnector 17A.

Similarly, the insulation rod 9 at the upper end of the middle actuating rod 25b extends through the rear end of the connecting conductor 14B and through the interior of a cylindrical conductor below the circuit breaker 18 and is connected at its upper end to a movable contact of the circuit breaker 18. In the same manner, the insulation rod 9 of the front actuating rod 25c is also connected at its upper end to a movable contact of a front disconnector 17B.

A fixed side contact of the disconnector 17B and one of the three bus bars within the horizontal bus compartment 20 are connected by a connecting conductor.

Spaces are formed between the insulation cylinders 11A through 11G, the walls of the horizontal bus compartment 20, the partition wall 10g, and the insulation cylinder 11G arranged in the above described configuration. Into these spaces, a silicon gel 29 of the double-fluid-mixing or two-part type is poured from above as indicated by hatching with short horizontal lines in FIG. 1, spaces 27 at the upper parts being left empty. The tops of the insulation cylinders 11E through 11G and of the horizontal bus compartment 20 are closed by covers 26.

The characteristics of the silicone gel used in this instance are as shown in the following table.

| | CHARACTERISTICS OF SILICONE GEL IN COMPARISON WITH THOSE OF OTHER SUBSTANCES | | | | |
|---|---|---|---|---|---|
| | SUBSTANCE | | | | |
| | | Gas | Mineral oil | Silicone | Solid |
| CHARACTERISTIC | Air | SF$_6$ | (JIS No. 2) | gel | epoxy |
| Dielectric Breakdown Value (kV/mm) | 3.2 | 8.6 | 12 (min.) | 17 | 17.8 |
| Volumetric resistivity ($\Omega$-cm) | — | — | $1 \times 10^{13}$ (min.) | $1 \times 10^{14}$ (min.) | $1 \times 10^{14}$ |
| Dielectric constant | 1 | 1 | 2.24 | 2.7 | 4.2 |

-continued

CHARACTERISTICS OF SILICONE GEL IN COMPARISON WITH THOSE OF OTHER SUBSTANCES

| CHARACTERISTIC | SUBSTANCE | | | | |
|---|---|---|---|---|---|
| | Gas | | Mineral oil | Silicone | Solid |
| | Air | $SF_6$ | (JIS No. 2) | gel | epoxy |
| Dielectric loss tangent (25° C. 50 Hz) | — | — | $6 \times 10^{-5}$ | $1 \times 10^{-3}$ | $1.2 \times 10^{-2}$ |
| Range of temp. used (°C.) | — | $-25 \sim 150$ | $-20 \sim 105$ | $-45 \sim 180$ | $-20 \sim 115$ |
| Thermal conductivity (Cal/cmsec °C.) | $5.12 \times 10^{-5}$ | $3.36 \times 10^{-5}$ | $3.1 \times 10^{-4}$ | $4.8 \times 10^{-4}$ | $2.0 \times 10^{-3}$ |
| Coeff. of expansion (cm/cm/t) | — | — | — | $3 \times 10^{-4}$ | $2.0 \times 10^{-5}$ |
| Specific gravity | $1.29 \times 10^{-3}$ | $6.52 \times 10^{-3}$ | 0.88 | 0.98 | 1.94 |
| Flame resistance | — | non-flammable | flash point 130° C. | equivalent to UL-HB | UL-HB |

The high-voltage enclosed switchboard of the above described construction according to this invention functions in the following manner.

First, it will be apparent from the above table that the silicone gel 29 held in the insulation cylinders and other spaces possesses good electrical characteristics such as dielectric breakdown value (strength), volume resistivity, dielectric constant, and dielectric loss tangent, and its allowable temperature of use is also high. Accordingly, by reducing dimensions such as the diameters of the insulation cylinders, spacing intervals and distances between grounding (earthing) metal members can be decreased. Therefore the box structure 10 can be miniaturized. Furthermore, since the viscosity of this silicone gel 29 is low (1,000 CP at 25° C.), its impregnability is good, and its gelating speed is high. Thus it has good workability and has tackiness, whereby its sealing property is good. Furthermore, this silicone gel is capable of absorbing and lessening vibrations and impact.

Another advantageous feature of this silicone gel is that, in comparison with sulfur hexafluoride, its thermal conductivity is high. For this reason, overheating of heat generating parts such as connections of the electrical equipment can be prevented, and the serviceable life of such equipment can be prolonged.

Still another advantageous feature of the silicone gel is that, once it has gelated, it does not readily leak, whereby its containing structure does not need to be gas tight as in the case of a box structure with insulation gas sealed therein. For this reason, not only is the fabrication of the box structure 10 facilitated, but, even in the case where the box structure should explode or rupture because of a short circuit due to some cause, there will be no discharging of a harmful gas, and scattering of flying pieces of parts is greatly reduced by the tackiness of the silicone gel. Thus the high-voltage enclosed switchboard has a high degree of safety.

Furthermore, at the time of maintenance work and inspection of items such as the contacts of vacuum valves, replacement of parts can be easily carried out by removing the covers 26 and turning components such as the circuit breaker 18 thereby to unscrew and disengage their lower ends. At this time, furthermore, the silicone gel 29 is poured in again. In contrast to replacement of insulation gas, this work is carried out locally part by part in a short time, moreover, without the necessity of using devices such as pumps. In addition, the mutual affinity between any remaining silicone gel and the newly poured silicone gel 29 is good.

In the above described example, increase of operating force of movable parts such as the circuit breaker 18 may be prevented by measures such as coating with a material such as a fluoric resin or coating with a liquid such as a silicone oil. Within the insulation cylinders such as 11B and 11C, the proportion of the gelation agent of the silicone gel 29 may be reduced thereby to decrease the consistency.

Furthermore, in the above described example, the pouring of the silicone gel 29 into the parts such as the insulation cylinders 11E to 11G is carried out after these parts have been installed within the box structure 10. However, this pouring in of the silicone gel into at least such parts such as the insulation cylinders 11D and 11E, together with the assembling of the internal electrical equipment, may be carried out outside of the box structuire 10, the installation therewithin being carried out thereafter.

Figure 2:
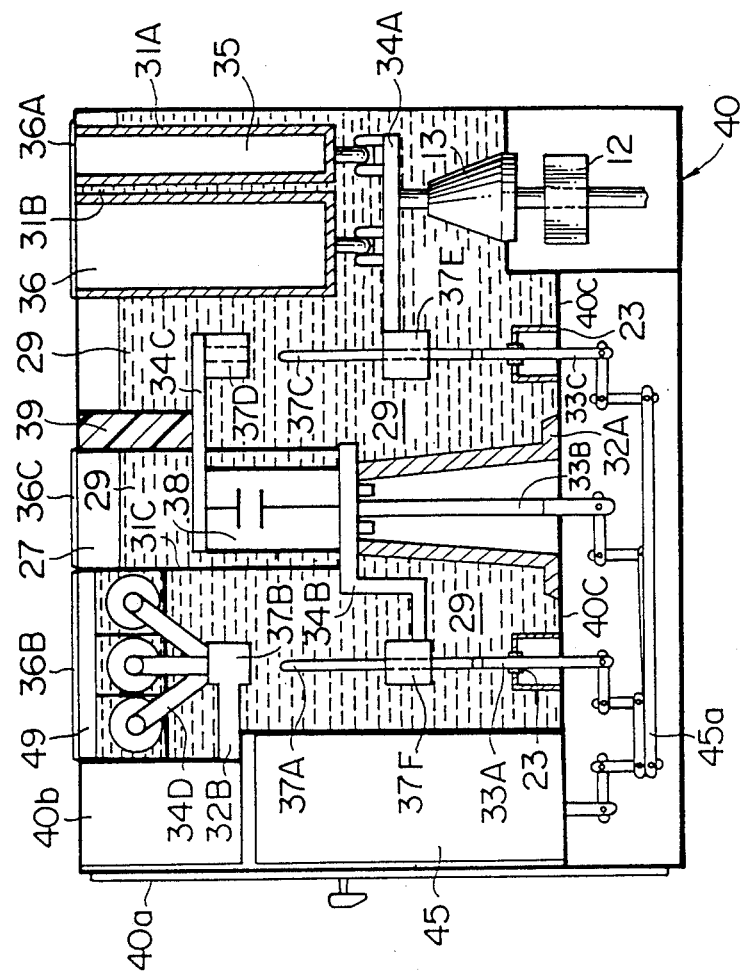
FIG. 2 is a side elevation similar to FIG. 1 showing another example of, a high voltage enclosed switchboard according to the invention.

Another embodiment of the switch gear, that is, a high-voltage enclosed switchboard, of this invention is illustrated in FIG. 2. The principal points on which this switchboard shown in FIG. 2 differs from that of the preceding embodiment shown in FIG. 1 are as follows. In the disconnector, a mechanism which accomplishes connection and disconnection by the linear shifting of a disconnecting rod is used instead of a vacuum bulb. Only a lightning arrester 35, a transformer 36 for instruments, and a circuit breaker 38 are accommodated within insulation cylinders 31A, 31B, and 31C. The control parts and motive power parts of an operating mechanism 45 are positioned on the front face for convenience in maintenance and inspection.

A box structure 40 of the switchboard has a door 40a at its front face. A control chamber 40b is formed behind the door 40a at the upper part of the box structure 40. Below this control chamber 40b is provided an operating mechanism chamber 45. A linkage mechanism 45a is installed in a space extending rearward along the floor of the box structure 40 and having a ceiling in the form of a horizontal partition 40c. Three insulation rods 33A, 33B, and 33C extend vertically upward through seals 23 in the partition 40c. A disconnection rod 37A is fixed to the upper end of the front insulation rod 33A. The upper end of this disconnection rod 37A is confronting a fitted contact point 37B on the fixed side mounted on the rear end of an insulation support member 32B.

A connecting cylinder 37F encircling the middle part of the disconnection rod 37A is in contact therewith through a contact point on its inner surface. The front end of a connecting conductor 34B is fixed to this connecting cylinder 37F. The rear end of this connecting conductor 34B is fixed to the top of an insulation structure 32A of inverted U shape in vertical section which is provided transversely at the middle part of the box structure 40.

The aforementioned insulation cylinder 31C is mounted on the upper part of this insulation structure 32A. Within this insulation cylinder 31C is accommodated the circuit breaker 38 with its movable contact on the lower side. Within the circuit breaker 38 is installed a vacuum bulb fixed at its lower part to the connecting conductor 34B. The upper end of the insulation rod 33B is coupled to the movable contact of the circuit breaker 38. To the terminal on the fixed side of the upper end of the circuit breaker 38 is fixed the front end of a connecting conductor 34C. The middle part of this connecting conductor 34C is fixed to the ceiling of the box structure 40 by a transversely disposed insulation support member 39. To the lower surface of the rear end of this connecting conductor 34C is secured a fitted connecting cylinder 37D having a contact point mounted on its inner surface. This connecting cylinder 37D is disposed to confront the upper end of a disconnecting rod 37C fixed to the upper end of the aforementioned insulation rod 33C.

The middle part of this disconnecting rod 37C is encircled by and contacted by a connection cylinder 37E by way of a contact point (not shown) accommodated within the connection cylinder 37E. This connection cylinder is fixed to the front end of a connecting conductor 34A. To the lower middle part of this connecting conductor 34A is connected the inner side of a cabled head 13 connected to a cable extending through a current transformer 12.

To the upper part of the rear end of the connecting conductor 34A is secured by screw threads the terminal of the lower end of the aforementioned lightning arrester 35 enclosed within the insulation cylinder 31A. To the upper part of the middle part of the connecting conductor 34A is secured by screw threads the terminal of the lower end of the transformer 36 for instruments enclosed within the insulation cylinder 31B. A cover 36A is provided on the upper surface of the box structure 40 above the insulation cylinders 31A and 31B.

At the upper part of the box structure 40, behind the control chamber 40b, a horizontal bus compartment 49 is provided to house horizontal bus bars of three phases. These bus bars are partitioned from each other by insulation partition plates. The tops of this bus compartment and the insulation cylinder 31C are also closed by covers 36B and 36C.

The spaces above the partition 40c within the box structure 40 are filled with the silicone gel 29. The interior of the horizontal bus compartment is also filled with the silicone gel 29.

In the instant embodiment the number of insulation cylinders is smaller than that of the preceding embodiment shown in FIG. 1. Also, the bus bars are arranged transversely. Therefore the construction is simple, but the space filled with the silicone gel increases.

In the embodiment of the invention described above, at least the circuit breaker, the transformer for instruments, the lightning arrester, and the bus bars of the equipment installed within the box structure are placed separately within respective vessels filled with the silicone gel. Thus the insulation characteristics of the intervals and spaces between metals for grounding are improved. As a result, a high-voltage enclosed switchboard which is of miniature size, is safe, and is easily maintained and inspected is obtained.

A lightning arrester suitable for use in either of the high-voltage enclosed switchboards described above and illustrated in FIGS. 1 and 2 will now be described with respect to a specific example thereof and with reference to FIGS. 3 and 4.

Figure 3:
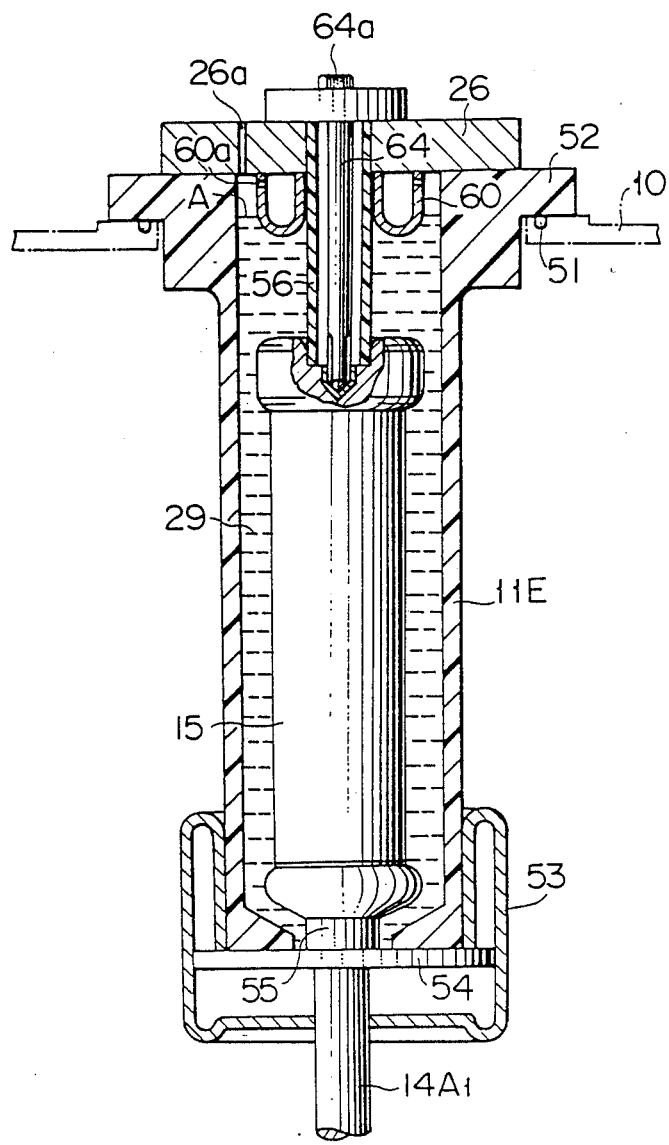
FIGS. 3 and 4 are elevations in vertical section showing an example of specific construction of a lightning arrester suitable for use in the high-voltage enclosed switchboard illustrated in FIG. 1 or FIG. 2.

Referring to FIG. 3, a circular hole is formed in the ceiling of the box structure 10. Through this hole the insulation cylinder 11E of circular cylindrical shape has been inserted from above until a flange 52 at its upper end is seated on the rim of the hole over a packing 51 interposed there between. This insulation cylinder 11E is assembled unitarily with an electrode part comprising a shield ring 53 the inner surface of which is contacting the outer surface of the bottom end of the insulation cylinder 11E, a disk 54 fixed to the inner surface of the shield ring 53, and a high-voltage electrode 55 fixed to the central part of the disk 54.

Within the insulation cylinder 11E is enclosed the arrester 15 with its lower end in contact with the electrode 55. At its upper end, this arrester 15 has a recess into which the lower end of an insulation cylinder 56 is fitted. A substantially cylindrical space is formed between the inner surface of the insulation cylinder 11E and the outer cylindrical surfaces of this insulation cylinder 56 and the arrester 15. Into this space, a silicone gel 29 of two-part type prepared by mixing two fluids in a gravimetric ratio of 1:1 is poured to the level A, an empty space being left above its liquid surface.

The upper end surface of the insulation cylinder 11E is covered by a metal cover 26 having a vent hole 26a. A shield electrode 60 with a vent hole 60a is secured to the lower surface of this cover 26 and around the insulation cylinder 56, which at its upper end is fitted in a central through hole in the cover 26. The cover 26 is held in place against the upper surface of the flange 52 by a contact/separation rod 64 which extends through the interior of the insulation cylinder 56 and at its lower end is screwed into the upper grounding side of the arrester 15. This rod 64 has at its upper end a terminal head 64a.

In the assembling of this arrester device, the arrester 15 is first inserted from above into the insulation cylinder 11E mounted in and on the box structure 10, and the lower end of the arrester 15 is fitted onto the electrode 55. The insulation cylinder 56 is then inserted into place from above, and the silicone gel 29 is poured into the remaining space within the insulation cylinder 11E up to the level A. The cover 26 is then set in place, and the contact/separation rod 64 is inserted therethrough and turned to fix the arrester 15. A grounding wire (not shown) is then connected to the terminal part 64a.

Figure 4:
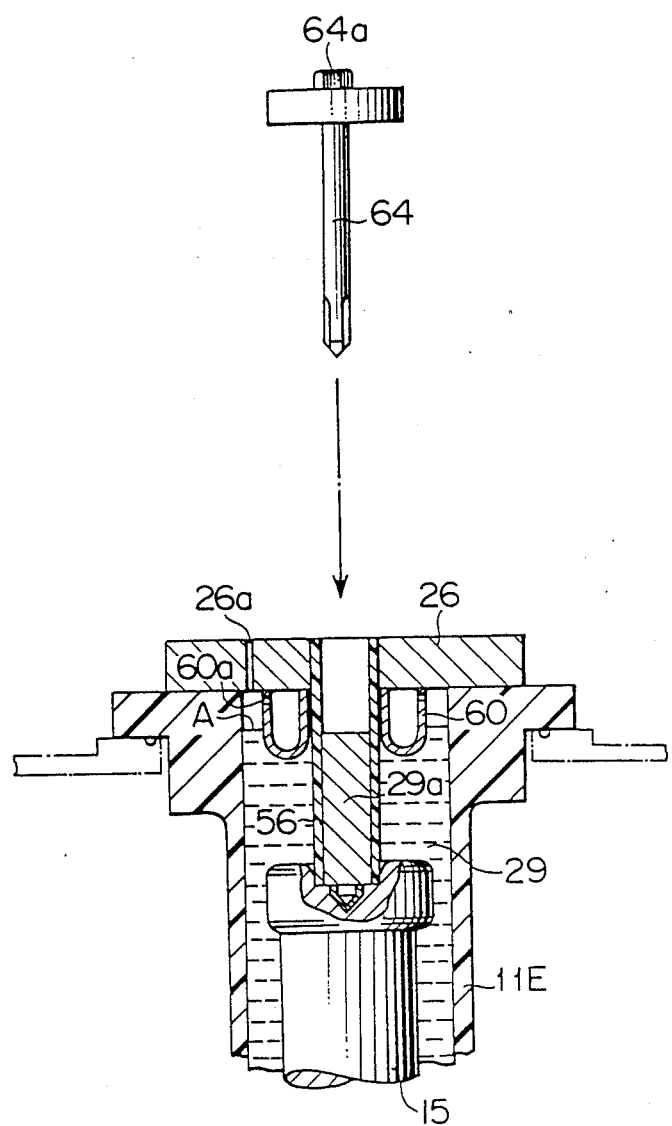

FIG. 4 shows the state wherein an enclosed switchboard with this arrester device installed therein is to be subjected to a voltage-withstand test. The contact/separation rod 64 is disconnected from the arrester 15, and a silicone gel 29a is poured into the insulation cylinder 56.

An arrester device of the above described construction functions in the following manner. The silicone gel 29 poured into this arrester device, in comparison with $SF_6$ gas used hitherto, has a dielectric breakdown strength which is two to three times higher, a thermal conductivity which is approximately seven times higher, and superior heat resistance and sealing property. For this reason, it is possible to reduce the diameter of the insulation cylinder 11E, to shorten the insulation distance between the shield electrode 60 and the arrester 15 for the voltage-withstand test, to reduce the length of the insulation cylinder 11E, and to prevent deterioration of the characteristics of the arrester 15 due to temperature rise.

Prior to the operation of a high-voltage enclosed switchboard of this character, it is put through a voltage-withstand test. If this test is carried out with the enclosed switchboard in a state wherein the arrester is connected to its main circuit, a harmful effect will arise because of current leakage. Therefore the test is conducted with the arrester disconnected from the main circuit. In the instant example, the arrester is cut off from the main circuit by drawing out only the contact-/separation rod 64 for the voltage-withstand test. Therefore, not only does the construction become simple, but there is no possibility of leakage of $SF_6$ gas from the sealed parts at the time of disconnection of the arrester as in the case of prior switchboards. Of course, resealing is unnecessary.

Furthermore, expansion and contraction of the silicone gel 29 due to operating and stopping of the enclosed switchboard will not cause rises in pressure within the insulation cylinder 11E since a vacant space is provided at the top of the insulation cylinder 11E, and a vent 26a is provided through the cover 26 to communicate this space with the outside air.

Another feature of this arrester is that when the contact/separation rod 64 is inserted or retracted, since it is isolated from the silicone gel 29 within the insulation cylinder 11E by the insulation cylinder 56, the silicone gel 29 cannot become communicated with the outside air, through the internal space of the cylinder 56 whereby there is no possibility of deterioration of its characteristics.

Still another feature of the arrester is that the time required for a voltage-withstand test thereon is short. The reason for this is that, when the silicone gel 29a is poured into the insulation cylinder 56 for this test, the voltage-withstanding characteristic undergoes no change from the time immediately after pouring and that after gelation.

As another example of a switch gear according to this invention, a vacuum load-break switch suitable for use in a distribution line will now be described in conjunction with FIGS. 5 and 6.

In countries where power distribution lines are supported on poles or masts, the vacuum load-break switches used therein are required to be miniaturized for reasons of installation. Another requirement is that of safety so as to prevent explosive bursting of the housing of the vacuum load-break switch due to generation of an internal arc caused by an over-voltage surge exceeding the withstanding capacity of a surge arrester provided therefor. The vacuum load-break switch of the invention described below can be miniaturized and, moreover, has high dielectric strength and a high degree of safety.

Figure 5:
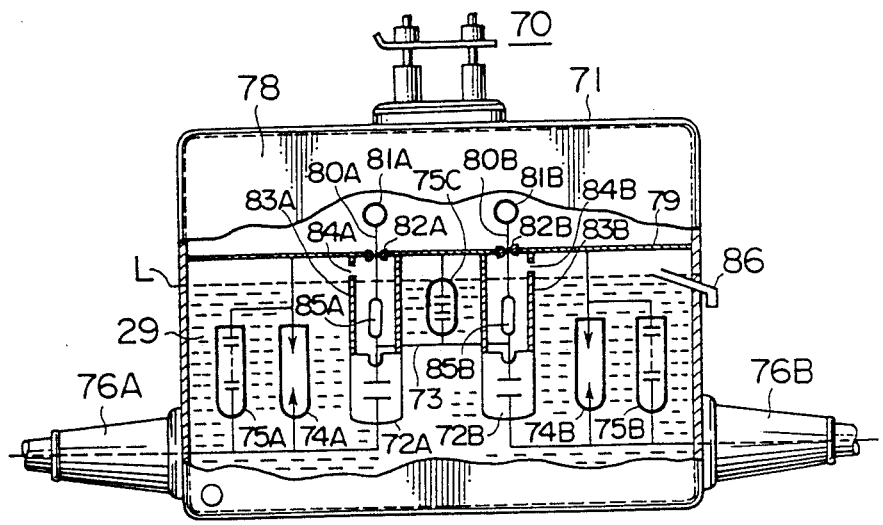
FIGS. 5 and 6 are respectively a side elevation, in vertical section with parts cut away, and a plan view of a vacuum load-break switch as another example of a switch gear of the invention.
Figure 6:
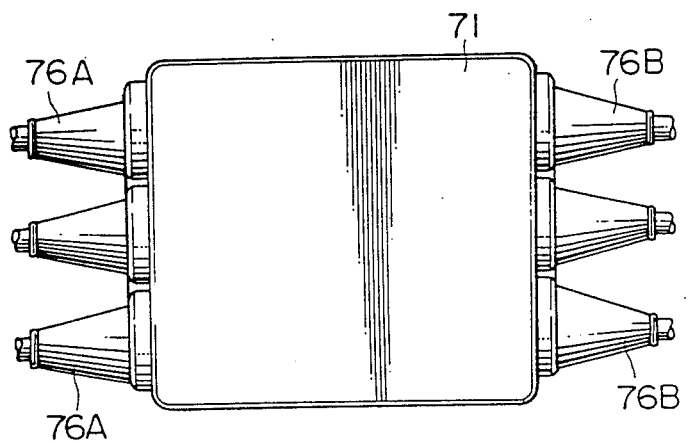

The vacuum load-break switch 70 shown in side elevation in vertical section in FIG. 5 has a metal housing or case 71 substantially of the shape of a rectangular parallelepiped. On the outer walls on the left and right (as viewed in FIGS. 5 and 6) ends of the case 71 at lower parts thereof, bushings 76A and 76B through which electrical wires are passed are mounted gas tightly. As shown in the plan view of FIG. 6, three bushings 76A and three bushings 76B are provided respectively for three phases. The interior of the case 71 is gas tightly divided into upper and lower sections by a horizontal metal plate partition 79. A manipulative control mechanism compartment 78 is provided in the upper section above the partition 79.

Within the lower section near the left and right ends thereof are mounted voltage detectors 75A abnd 75B. Surge arresters 74A and 74B are installed adjacently on the inner sides of the voltage detectors 75A and 75B. The voltage detector 75A and the arrester 74A are mounted vertically and electrically connected in parallel connection between the electrical wire passed through the bushing 76A and the partition 79. Similarly, the voltage detector 75B and the arrester 74B are mounted vertically and electrically connected in parallel connection between the electrical wire passed through the bushing 76B and the partition 79.

At the middle of the lower section of the case 71, a voltage detector 75C is provided vertically and has an upper terminal connected to the partition 79. On the left and right sides of and below this voltage detector 75C, a vacuum bulb 72A for make and break function and a vacuum bulb 72B for disconnection are respectively provided vertically. Fixed side terminals at the lower ends of these vacuum bulbs 72A and 72B are respectively connected to the above mentioned electrical wires passed through the bushings 76A and 76B.

Between the upper faces of the vacuum bulbs 72A and 72B and the partition 79, insulation cylinders 83A and 83B of substantially the same diameters as the vacuum bulbs 72A and 72B are disposed substantially coaxially therewith. The lower ends of the insulation cylinders 83A and 83B are joined in a gas-tight manner to the upper rims of the vacuum bulbs 72A and 72B. The insulation cylinders 83A and 83B are provided at their upper parts with vent holes 84A and 84B.

Through the centers of the insulation cylinders 83A and 83B, connecting rods 80A and 80B are provided, extending at their upper parts upward through packings 82A and 82B made of a fluororesin and fitted in through holes formed in the partition 79. The upper ends of these connecting rods 80A and 80B are coupled to actuating rods 81A and 81 of a manipulative control mechanism (not shown) for opening and closing the vacuum bulbs 72A and 72B. The lower ends of the connecting rods 80A and 80B are coupled by way of insulation bars 85A and 85B to movable side terminals of the vacuum bulbs 72A and 72B. A connecting conductor 73 connected at its middle part to a lower terminal of the aforementioned voltage detector 75C is connected horizontally between the movable-side terminals at the upper parts of the vacuum bulbs 72A and 72B.

An insulated electrical wire (not shown) is connected to each of intermediate terminals of the grounded sides (not shown) of the voltage dectors 75A and 75B and of the voltage detector 75C. The other end of this insulated electrical wire is connected to each of terminals for voltage detection (not shown) provided on an outer wall of the metal case 71.

Into the interior of the case 71 in which the principal circuit components have been installed in the above described manner, a silicone gel 29 of double-fluid mixture type is poured through an inlet (not shown) provided in the middle bottom part of the outer wall of the case 71. The silicone gel 29 is thus poured up to a height level L near the lower part of the partition 79, including the interiors of the insulation cylinders 83A and 83B, an air space being left above the gel surface. A short pipe 86 provided with a plurality of small lateral holes extends in a declining direction outward through the right-hand outer wall of the case 71 and has an inner open end in the vicinity of the above mentioned level L.

The vacuum load-break switch of the above described construction according to the invention has the following function and effectiveness.

First, the fluid mixture of the silicone gel 29 of a mixing ratio of 1:1 which has been poured into the case 71 to the height level L is gelated at room temperature or under heating. The gel expands and contracts somewhat with the ambient temperature variations. However, since the upper air layer and the pipe 86 is provided, there is little effect of perssure on the case 71.

The moisture in the air within the case 71 may condense because the vacuum load-break switch is opened and closed or because of variations in the surrounding conditions. This may lead to an accumulation of water on the upper surface of the silicone gel 29, but this water will be discharged outside through the pipe 86.

The silicone gel 29 thus placed in the case 71 has an excellent characteristics, such as dielectric breakdown value, volumetric resistivity, dielectric constant, dielectric loss tangent as well as a high upper limit of its serviceable temperature range. Therefore the distances between the installed components and parts and those of potential relative to ground can be reduced with the resultant reduction of the overall size of the switch. It should be mentioned that a reduction to $\frac{1}{2}$ is theoretically possible in view of the ratio of dielectric breakdown values. Furthermore, since the viscosity of the gel is low (1,000 CP at 25° C.), its impregnability is good, and its gelating speed is high. Therefore its handling is convenient. Moreover its sealability is also good because of its tackiness. In addition, the gel has the capability of absorbing and lessening vibrations and impact at the time of opening and closing the vacuum load-break switch.

In comparison with air of $SF_6$ gas used heretofore, the silicone gel has a higher thermal conductivity. For this reason, it affords better discharging of heat to the outside air via the metal enclosures of the principal circuit components within the case 71. Thus temperature rises of heat generating parts are suppressed.

Another feature of this silicone gel is that it does not entail infiltration of lightning surges and scattering of harmful gases due explosion as in the case of a case which has been miniaturized by sealing of $SF_6$ gas therein.

Still other features of this silicone gel are its excellent flame resistance or nonflammability, the fact that it does not generate harmful gases, its waterproof, moistureproof, and corrosion-proof property, and its softness (hardness of 1 by JISA). Therefore, there is little increase in the force required to manipulate the connecting rods 80A and 80B. The silicone gel can be readily removed for example when the vacuum load-break switch is disconnected from an overhead line and is to be inspected.

Another advantageous feature of the instant vacuum load-break switch 70 is that fluororesin packings 82A and 82 are used at the parts of the partition 79 where the connecting rods 80A and 80B pass therethrough. By this provision, even if a silicone gel component vaporizes and fills the air layer above the gel, infiltration of this vaporized component into the control mechanism compartment 78 can be prevented. Therefore defective contacting of the metal contact points of the relays for control in the interior thereof is prevented.

A further feature of this vacuum load-break switch 70 is the provision of the voltage detector 75C between the partition 79 and the connecting conductor 73 connecting the movable side terminals of the vacuum bulbs 72A and 72B. Because of this provision, if the contact points of the vacuum bulbs 72A and 72B are not open, because of some reason, this can be detected through an exterior terminal, whereby safety is maintained.

It is to be noted that, in the case where the air space above the silicone gel 29 is thick, and the rise in internal pressure due to expansion of the silicone gel is small, or the interior temperature rise is small, the pipe 86 provided through the end wall of the case 71 can be omitted.

As described above, the insulation cylinders 83A and 83B are filled with the same silicone gel 29 as that used outside of these insulation cylinders. However, increase in the force required to actuate the connecting rods 80A and 80B may be suppressed by reducing the hardening agent in only these cylinders to decrease the viscosity of the gel therein.

What is claimed is:

1. A switch gear comprising: a box structure constituting a case; items of electrical equipment including disconnecting means and circuit-breaking means installed within said box structure; connecting conductors for connecting said electrical equipment items; operating mechanisms for operating said disconnecting means and said circuit-breaking means installed within said box structure; connecting conductors for connecting said electrical equipment items; operating mechanisms for operating said disconnecting means and said circuit-breaking means; partition walls for partitioning the interior of the box structure into compartments for accommodating said operating mechanisms and compartments for accommodating the electrical equipment items; and masses of a silicone gel filling said compartments accommodating the electrical equipment items, the interior of each of said compartments for accommodating said electrical equipment items being filled with said silicone gel up to a specific height level, an empty space being left at an upper part of each of said interior above the silicone gel.

2. A switch gear as claimed in claim 1 in which said electrical equipment further includes a transformer for instruments and a lightning arrester, and said connecting conductors include a transverse bus bar, all of the above items of equipment being embedded in a silicone gel.

3. A switch gear as claimed in claim 2 in which said lightning arrester is accommodated within an electrical insulation cylinder, and the space between said insulation cylinder and said lightning arrester is filled with a silicone gel.

4. A switch gear as claimed in claim 1 in which the inner end of a contact/separation rod extending out of said insulation cylinder and having an outer end connected to the grounded side of said lightning arrester is connected to one end of the lightning arrester, and said contact/separation rod is capable of contacting and separating from the lightning arrester.

5. A switch gear as claimed in claim 4 in which said contact/separation rod is enclosed within a small insulation cylinder encompassing the contact/separation rod within the insulation cylinder and is isolated from the silicone gel.

6. A switch gear as claimed in claim 1 in which horizontal partition walls are so provided that said compartments for accommodating said electrical equipment items are above said compartments for accommodating said operating mechanisms, and empty spaces above said silicone gel are immediately below the ceiling wall of said box structure.

7. A switch gear as claimed in claim 1 in which a partition wall is so provided that said compartments accommodating said electrical equipment items are below said compartments accommodating said operating mechanisms, and empty spaces above said silicone gel are positioned immediately below said partition wall.

8. A switch gear as claimed in claim 1 in which disconnection rods of said disconnecting means is provided so as to be capable of functioning within the silicone.

* * * * *